United States Patent [19]

Takahashi

[11] Patent Number: 5,164,841

[45] Date of Patent: Nov. 17, 1992

[54] RECORDING APPARATUS FOR RECORDING AN AUDIO AND VIDEO SIGNALS

[75] Inventor: Hirokazu Takahashi, Kanagawa, Japan

[73] Assignee: Canon Kabushiki Kaisha, Tokyo, Japan

[21] Appl. No.: 227,749

[22] Filed: Aug. 3, 1988

[30] Foreign Application Priority Data

Aug. 11, 1987 [JP] Japan ................... 62-200554

[51] Int. Cl.$^5$ .............................................. H04N 5/76
[52] U.S. Cl. .................................... 358/341; 360/14.1
[58] Field of Search ............... 358/906, 909, 341, 342, 358/335, 312, 908; 360/14.1, 14.2, 14.3, 33.1, 35.1, 19.1, 13

[56] References Cited

U.S. PATENT DOCUMENTS

| | | | |
|---|---|---|---|
| 4,348,698 | 9/1982 | Schomann | 360/24 |
| 4,428,001 | 1/1984 | Yamamura et al. | 360/14.1 |
| 4,531,161 | 7/1985 | Murakoshi | 360/19.1 |
| 4,725,897 | 2/1988 | Komshi | 358/341 |
| 4,812,922 | 3/1989 | Minoura et al. | 360/10.1 |
| 4,816,928 | 3/1989 | Sasaki et al. | 360/19.1 |
| 4,823,199 | 4/1989 | Sakakibara et al. | 358/906 |
| 4,841,504 | 6/1989 | Yamaguchi et al. | 360/72.1 |
| 4,858,031 | 8/1989 | Fukuta | 358/342 |
| 4,858,032 | 8/1989 | Okada et al. | 358/343 |

Primary Examiner—Robert L. Richardson
Assistant Examiner—Huy Nguyen
Attorney, Agent, or Firm—Robin, Blecker, Daley & Driscoll

[57] ABSTRACT

A recording apparatus using a recording medium on which a video signal and an audio signal can be recorded together is disclosed. For after-recording the audio signal in correspondence to an arbitrary video signal, there are provided a mode for confirming the audio signal recorded just before during recording of the audio signal and a mode for altering a correspondence relationship between the video signal and the audio signal. Further, it is possible to record an audio signal in correspondence to a vacant area on the recording medium.

32 Claims, 6 Drawing Sheets

RECORDING APPARATUS FOR RECORDING AN AUDIO AND VIDEO SIGNALS

BACKGROUND OF THE INVENTION

1. Field of the Invention

This invention relates to a recording apparatus capable of recording a sound along with a still image on a recording medium.

2. Description of the Related Art

In recent years, to make the magnetic disc find its use in recording still images and sounds or reproducing them therefrom, a still video system has been proposed. With this, the shot image can immediately be reproduced, or printed out. Further the image can be transported to any remote place through the telecommunication line. And editing also is easy to perform. From the reason of these unique features, the system is rapidly spreading.

The still video system has its record format for video and audio signals standardized so that the video signal for a still image and the audio signal can be recorded and reproduced in and from the respective tracks formed on the magnetic disc. At the time of recording the audio signal, there is also recorded a control code comprised of various kinds of control information including those on the record conditions for the audio signal and the position of the track in which the corresponding video signal. Based on this control code, information necessary to the coordination, recording and reproduction on the magnetic disc is obtained. Hence, for example, at the time of reproduction of the audio signal, the video signal corresponding to that audio signal can be reproduced.

To the above-defined format, however, there is no standard concerning the method of referring the record positions of a still image and a sound to each other, as they should be recorded in conjunction to each other on the recording medium or the magnetic disc, except for a mere provision that only when the sound is recorded in a vacant track, it becomes possible to address a video track. Hence there has been a problem in the method for establishing good correspondence between a sound and a still image when recording, particularly the method for inputting still images with respect to the continuous sound input. Accordingly, in the conventional still video system, the recording head often takes wasteful motion, contributing to a difficulty of corresponding the still image and the accompanying sound in good timing to each other. When reproduced, therefore, the sound and the image appear in no accurate correspondence with each other, or in a time gap from each other, and the timing of change from one image to the next does not coincide with that of change from one sound to the next. These constitutes a great problem in the use of the still video system.

As one means to solve this problem, the recording apparatus may be provided with means for, prior to making record of an audio signal, reproducing the one of the video signals which is chosen for accompaniment with that audio signal, and also with means for altering the track of a video signal to be reproduced, as proposed in U.S. patent application Ser. No. 193,369 filed on May 12, 1988 now U.S. Pat. No. 4,965,675 and assigned to the assignee of the present invention.

SUMMARY OF THE INVENTION

The present invention has for its general object to eliminate the conventional problems. Under such an object, a first aspect of the invention is to improve the technique disclosed in the above-identified application.

Another object of the invention is to provide a recording apparatus in which as a recording medium having record information recorded thereon is used for recording record information in predetermined correspondence relationship to the recorded record information, it is made possible that the correspondence relationship of each record information is made sure and the record area on the medium is effectively used. To achieve this object, as a preferred embodiment of the invention, a recording apparatus is disclosed in which, on recording sound record information in a correspondence relationship with the video record information recorded on the recording medium and at a different position from that of the video record information, immediately after the sound record information has been recorded, its recorded state can be confirmed.

Another object of the invention is to provide a recording apparatus in which as record information is recorded on a recording medium in a predetermined correspondence relationship to the record information recorded thereon, while their correspondence relationship is made sure, it is made possible to alter the correspondence relationship and prevent a faulty operation.

Another object of the invention is to provide a recording apparatus in which when to carry out after-recording of record information with respect to the recorded record information on a recording medium, the manageability therefor is very good.

To achieve these objects, according to a preferred embodiment of the invention, a recording apparatus in which by using a recording medium having video signal information recorded thereon, sound record information is recorded in a predetermined correspondence relation to the video signal information, is provided with means for confirming the recorded state of the sound record information soon after it has been recorded, and altering means for altering the above-described sound record information and the correspondence relationship during the confirming of the recorded state, thereby giving an advantage that when video record information and sound record information are recorded in correspondence to each other and in mixture on the recording medium, the degree of freedom of setting that correspondence relationship is extended and the manageability is improved.

Another object of the invention is to provide a recording apparatus in which the correspondence relationship between different record information to be recorded together on a recording medium can be previously set, making it possible to improve the manageability and to enhance the function.

To achieve such an object, according to the invention, in the recording apparatus capable of recording video signals and audio signals together on a recording medium, when to record the audio signal, by making it possible to perform the recording in correspondence to a vacant area on the recording medium, it is made possible to reserve a corresponding record area at the record time of the audio signal, and to carry out after-recording of a video signal after the audio signal has been recorded. Thus, a recording apparatus of improved manageability is disclosed.

Other objects and features of the invention will become apparent from the following description and drawings.

BRIEF DESCRIPTION OF THE DRAWINGS

All the drawings illustrate an embodiment of the invention.

DETAILED DESCRIPTION OF THE PREFERRED EMBODIMENT

The recording apparatus of the invention is next described in connection with an illustrated embodiment in all the drawings.

Figure 1:
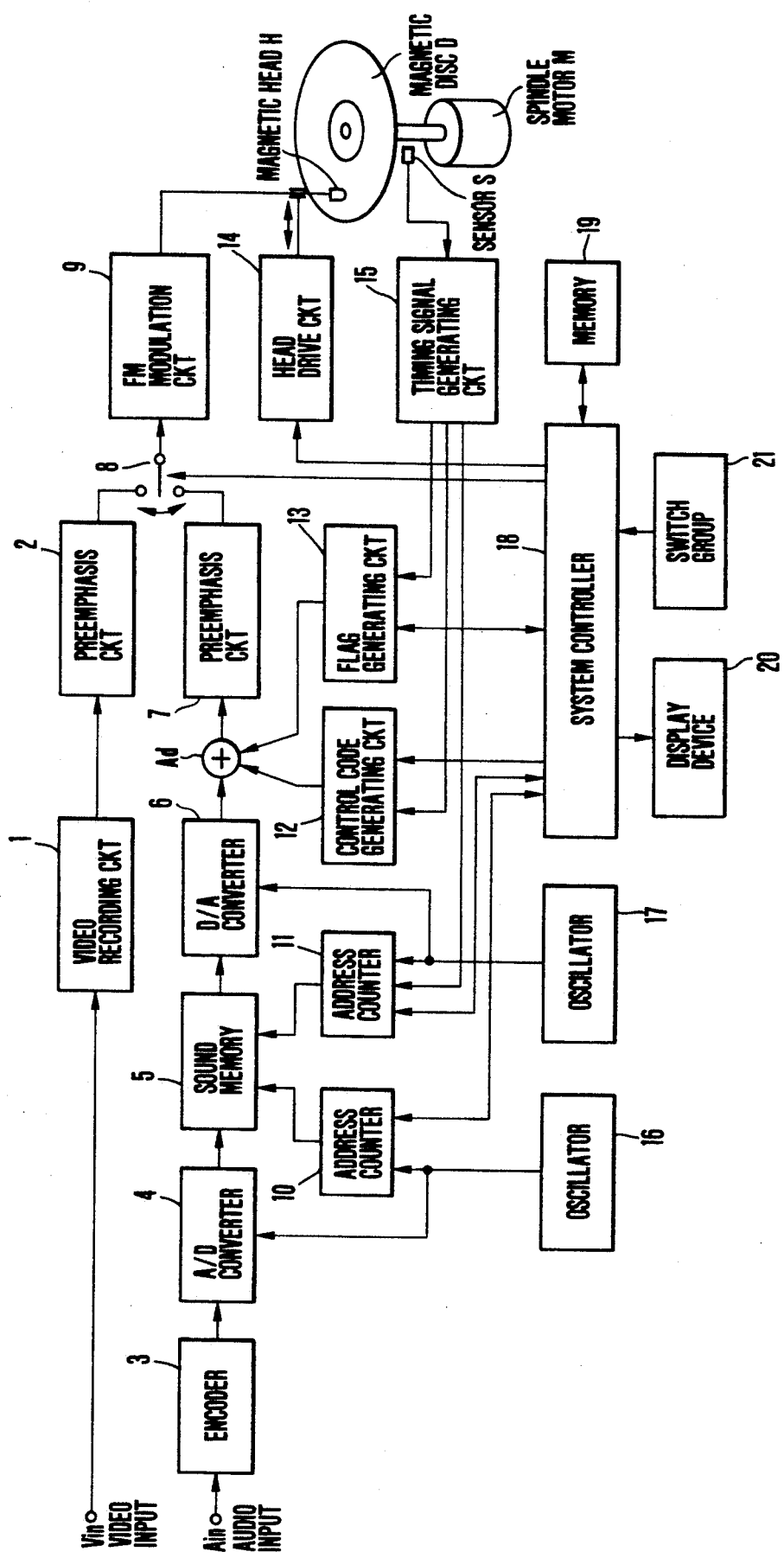
FIG. 1(a) is a block diagram of the recording system of a recording apparatus of the invention.
FIG. 1(b) is a block diagram of the reproducing system.
Figure 1B:
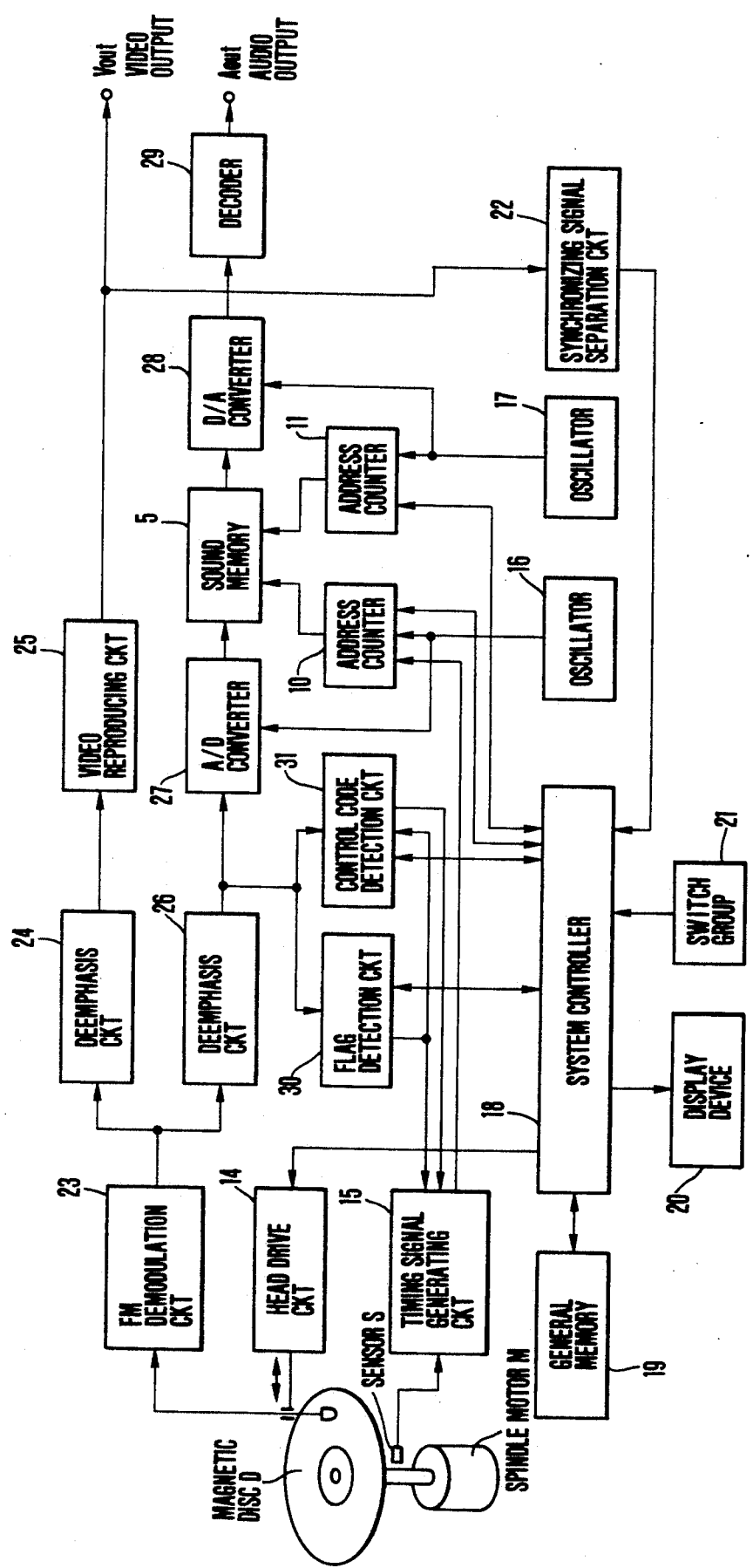

FIGS. 1(a) and 1(b) show the signal flows when the recording and reproduction apparatus of the invention operates in the recording or reproduction mode, respectively.

In FIG. 1(a), a magnetic disc D is rotated by a spindle motor M. A magnetic head H on the magnetic disc D is moved in a radial direction by a head drive circuit 14, changing the track to be accessed. A sensor S detects the phase of rotation of the magnetic disc D.

An image recording system is as follows: A video signal entering at an input terminal Vin is treated by a video recording circuit 1 for Y-C separation, chrominance line-sequential processing, and others. A preemphasis circuit 2 emphasizes the high frequency band of the input signal to improve the S/N ratio. 9 is an FM modulation circuit.

A sound recording system includes: A sound input terminal Ain; an encoder 3 for noise reduction; an A/D converter 4 for converting analog input signals as sampled at a frequency of a clock from an oscillator 16 to digital form; a sound memory 5 for storing the audio signal of digital form; an address counter 10 for selecting the address of a location of the sound memory 5 in which the digital output signal of the A/D converter 4 is to be stored on the basis of the frequency of the oscillator 16; another address counter 11 responsive to a command from a system controller 18 for selecting the address of a location of the sound memory 5 from which data are to be read on the basis of the frequency of the clock of an oscillator 17; a D/A converter 6 for converting digital input signals from the sound memory 6 to analog form according to the frequency of the oscillator 17; a preemphasis circuit 7 for emphasizing the high frequency band of the input signal; a control code generating circuit 12 responsive to a command from the system controller 18 for producing various kinds of control information representing the time base compression rate of the sound, the numbers of the corresponding video track and the subsequent track, the form of data and others in the form of a control code; and a flag generating circuit 13 responsive to a command from the system controller 18 for producing various control flags. And, the audio signal after having been added with the outputs of the control code generating circuit 12 and the flag generating circuit 13 by an adder Ad is supplied to the preemphasis circuit 7, then to the FM modulation circuit 9 and therefrom supplied to the magnetic head H by which it is recorded on the magnetic disc D. Incidentally, 8 is a switch for selecting either one of the video and audio signals to be recorded on the magnetic disc D. Its switching is controlled by the system controller 18.

A timing signal generating circuit 15 receives the output of the sensor S and produces timing signals depending on the phase of rotation of the disc D, based on which the address counter 11, the control code generating circuit 12 and the flag generating circuit 13 are driven.

The system controller 18 controls coordination of all the portions of the apparatus. The system controller 18 is to have the address counters 10 and 11 command the sound memory 5 with the write and read speeds corresponding to the time base compression rate and the addresses, and also to have the control code generating circuit 12 and the flag generating circuit 13 produce respectively the control code and the flag and other information. Also, it controls the head drive circuit 14, the spindle motor M and any other mechanisms.

A general memory 19 is connected to the system controller 18 for the purpose of previously storing data and variables, etc., which are to be used in internal computations, and a program for the sequence of the various controls. The control states of the system controller 18 are displayed on a display device 20. A switch group 19 for instructing the system controller 18 to perform a desired one of the operations comprises a plurality of switches accessible from the outside of the apparatus.

Therefore, in the case when recording is carried out in the above-described recording system, as for recording of the video signal, the video signal inputted from the video input terminal Vin is subjected to various treatments beginning with the Y-C separation, chrominance line-sequential processing, etc., by the video recording circuit 1. After the high frequency band of the signal have been emphasized by the preemphasis circuit 2, if the movable contact of the switch 8 is in the video side, the signal is FM-modulated by the FM modulation circuit 9, supplied to the magnetic head H, and recorded in a track on the magnetic disc D.

As to recording of the audio signal, the audio signal inputted from the sound input terminal Ain is supplied through the encoder 3 for noise reduction to the A/D converter 4, sampled with the frequency of the clock of the clock oscillator 16, and converted to a digital signal. And, when a request for start of the sound recording is made, the system controller 18 to be described later commands the address counter 10 so that the audio signal converted to the digital signal is stored in the sound memory 5 according to the sound time base compression rate selected by a predetermined switch in the switch group 21. The address counter 10 is to address the position to be accessed on the sound memory 5 in response to the command of the system controller 18. And, when the amount of stored audio signal on the sound memory 5 exceeds the capacity of one track of the magnetic disc D, or when a request for movement to another track is sent to the system controller 18 by changing over the still image corresponding to the sound under recording, the system controller 18 moves the magnetic head H to a track capable of recording sound on the magnetic disc D by the head drive circuit 14, then reads the audio signal stored in the sound memory 5 at the corresponding speed to the frequency of the oscillator 17, that is, the set time base compression rate by the address counter 11, and then converts it to an analog signal by the D/A converter 6 with the same frequency. And, after the flag, control code (the time base compression rate, the corresponding video track, the subsequent track, the work condition of sectors, etc.) produced from the flag generating circuit 13 and the control code generating circuit 12 have been added, the analog signal is applied through the preemphasis circuit 7 and the FM modulation circuit 9 to be recorded in FM-modulated form on the magnetic disc D. Also, the operation of storing the audio signal on the sound memory 5 and recording it on the magnetic disc D is continued until a sound recording stop is requested or the usable vacant tracks on the magnetic disc D are used up.

Next, the reproduction system is described. Yet, as to the same constituent parts to those of the above-described recording system, the same references are used and their explanation is omitted.

In FIG. 1(b), an FM demodulation circuit 23 demodulates the FM-modulated record signal reproduced from the magnetic disc D. In the case when the demodulated signal is the video signal, it is supplied through a deemphasis circuit 24 of the characteristic reverse to the emphasis characteristic of the record time and of a nonlinear characteristic to a video reproducing circuit 25, and, after having been treated to a form suited to a monitor (not shown) or any other viewing instrument, is outputted from a video output terminal Vout. The video signal is also supplied to a synchronizing signal separation circuit 22, where a synchronizing signal is extracted and, then, supplied to the system controller 18. By this, from the presence or absence of the synchronizing signal, detection of whether or not the reproduced signal is a video signal can be carried out.

In another case when the FM-demodulated signal is an audio signal, it is supplied through a deemphasis circuit 26 to an A/D converter 27, converted to a digital signal according to the frequency of the oscillator 16, and written in the sound memory 5 at locations determined by the address counter 10. At the same time, the flag and control codes are detected from the reproduced signal by a flag detection circuit 30 and a control code detection circuit 31 respectively, and sent to the system controller 18. When the extraction of the flag and the control code is detected, the timing signal generating circuit 15 instructs the address counter 10 to store the A/D converted signal in the sound memory 5, and the storing in the sound memory 5 is carried out.

And the system controller 18 sends the time base compression rate for the audio signal in the extracted control code to the address counter 11, commanding that the data stored in the memory 5 is read with the clock frequency of the oscillator 17 in the timing of the time base expansion rate corresponding to the time base compression rate at the time of recording.

The signal read from the sound memory 5 is converted to an analog signal by the D/A converter 28, and outputted through a decoder 29 to an audio output terminal Aout.

The system controller 18 always watches the address counters 10 and 11, so that when the amount of stored audio signal on the sound memory 5 becomes small, it gives off a command of fetching the audio signal recorded in that track on the magnetic disc D which has been indicated by the control code to the sound memory 5.

Such a procedure is repeated until a reproduction stop is requested by a stop switch (not shown) in the switch group 21, or until the reproduced flag indicates that the track in which the subsequent audio signal is recorded is not present on the magnetic disc D.

The arrangement of the circuit blocks of the entirety of the recording apparatus of the invention is made as such. Next, the sound recording operation and the sound record pausing operation which are essential to the invention are described in great detail by using the flowcharts shown in FIG. 2 and FIG. 3.

When the magnetic disc D is set on the apparatus, the magnetic head H scans a surface of the magnetic disc D, so that an initializing operation is carried out to make up a data table (in this embodiment, shown as a track information table) for record information on each recorded track on the magnetic disc D, or the record condition of each track and the order of reproduction such as the numbers of the still image recorded tracks, the order of reproduction of the sound recorded tracks (step 1). After that, the various controls over the disc D loaded at present beginning with those for recording and reproducing the images and sounds with the steps beginning with the movement of the head H are carried out based on this track information table.

In a step 2, selection of the recording mode and the reproduction mode is carried out. Here in the recording mode in the apparatus of the invention, there are provided a mode that the recording is continued until a request for stopping the recording after the start of the recording is given and a mode that each time a predetermined time (for example, the time necessary to record the audio signal in one track) from the start of the recording passes, a recording operation stopping state, i.e., a pause state occurs. These modes can be chosen by a selection switch in the switch group 21.

Figure 2:
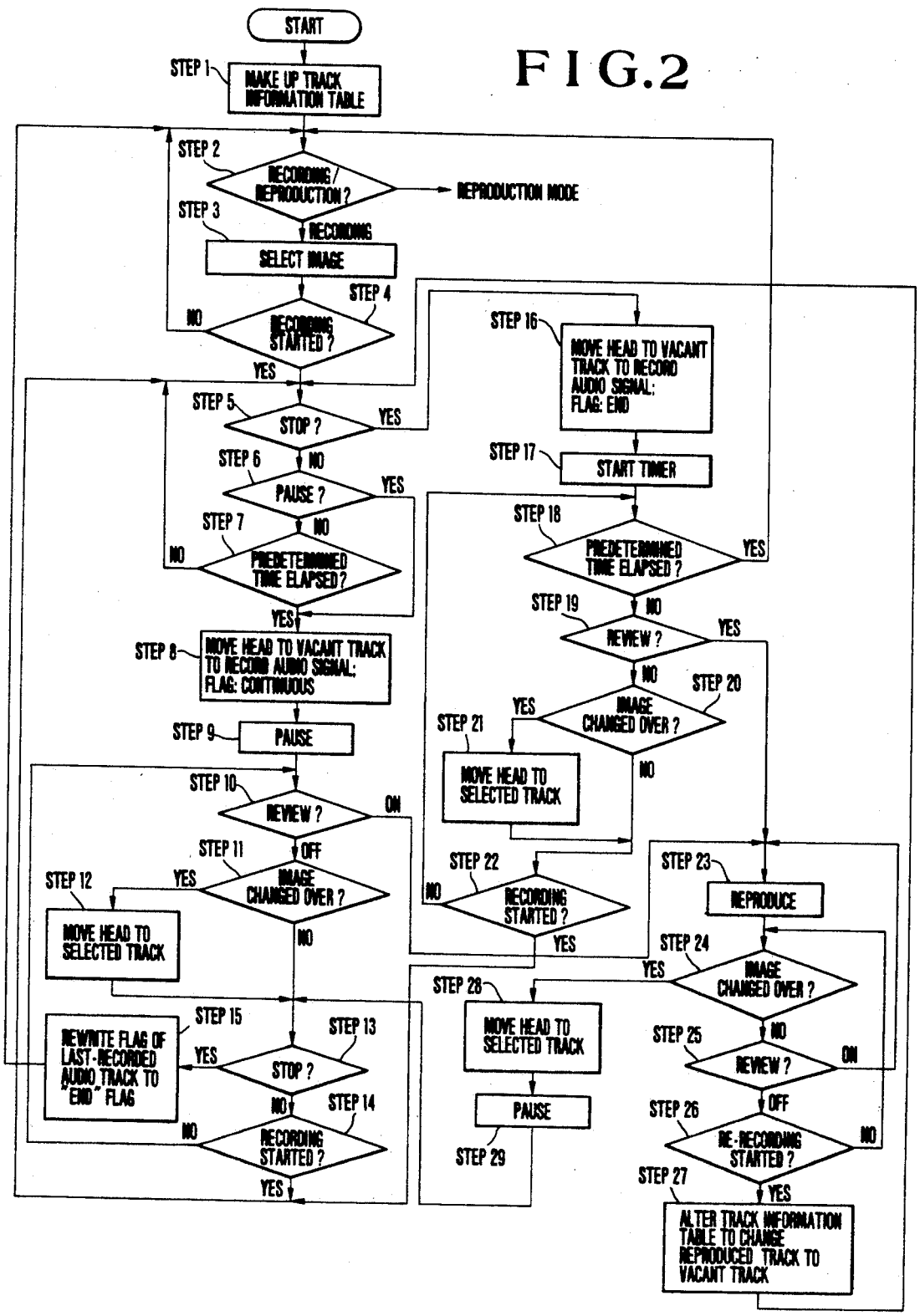
FIG. 2 is a flowchart to explain the recording mode with an automatic pause operation.

In the embodiment shown in FIG. 2, it is assumed that the latter mode, i.e., a recording mode in which the apparatus automatically comes into the pause state after each predetermined time, has been selected.

After the above-described recording mode has been selected in the step 2 and the first image corresponding to a sound to be recorded by now is chosen by a switch in the operating switch group 21 in a step 3, a sound recording becomes possible to start by a recording start switch in the switch group 21 in a step 4. And, when the recording start switch is operated, the audio signal entering at the sound input terminal Ain is supplied to the A/D converter 4. The A/D-converted audio signal starts to be stored in the sound memory 5. And, if the stop switch and the pause switch in the switch group 21 are not operated during recording, at a point when a predetermined time corresponding to the time base compression rate previously set before the start of the sound recording operation (for example, a period of time of the sound recordable in one track of the magnetic disc D at the time base compression rate of the audio signal being taken in at present) has passed (step 7), the head H is moved to a vacant track to record the audio signal which has so far been stored in the sound memory 5 with addition of the flag and the control code which can continue to the next track when in reproduction (step 8). Also, in the above-described recording operation, even if before the elapse of the predetermined time, when the pause switch is operated (step 6), the procedure advances to the step 8 and the audio signal stored in the sound memory 5 is recorded together with the flag and control code which can continue to the next when in reproduction. Also, in the case when the stop switch has been operated in the recording operation (step 5), the audio signal stored in the sound memory 5 is recorded in such a way that the flag continuing to the other track is not written, but the flag and control code for, when in reproduction, terminating the reproducing operation where the sound recorded in that track has been reproduced are added, and the head is moved to a vacant track (step 16). That is, it is here that a series of successive signal data of the audio signal to be reproduced ends. At this time, the position to be recorded on the magnetic disc D can be obtained by searching the track information table made up in the step 2. The details of this routine will be described later.

After the recording on the magnetic disc D has been carried out in the step 8, an advance to a step 9 occurs where the recording operation automatically becomes a pause state. With this pause state going on, in the case when a reviewing operation of a step 10 is not carried out, by using an operating switch in the switch group 21, a still image to be reproduced for the next time can be chosen by sequencing the tracks in the normal direction or by direct access of the video track (step 11). And in the case when the operation of changing over the image has been carried out in the step 11, a branch to a step 12 is made and, at the same time, the magnetic head H is moved to the track of the selected image. Then, advance is to a step 13.

In connection with the step 11, it should be noted that in order that after the sound recording, a still image to be reproduced is recorded, a vacant track can be addressed.

Figure 4:
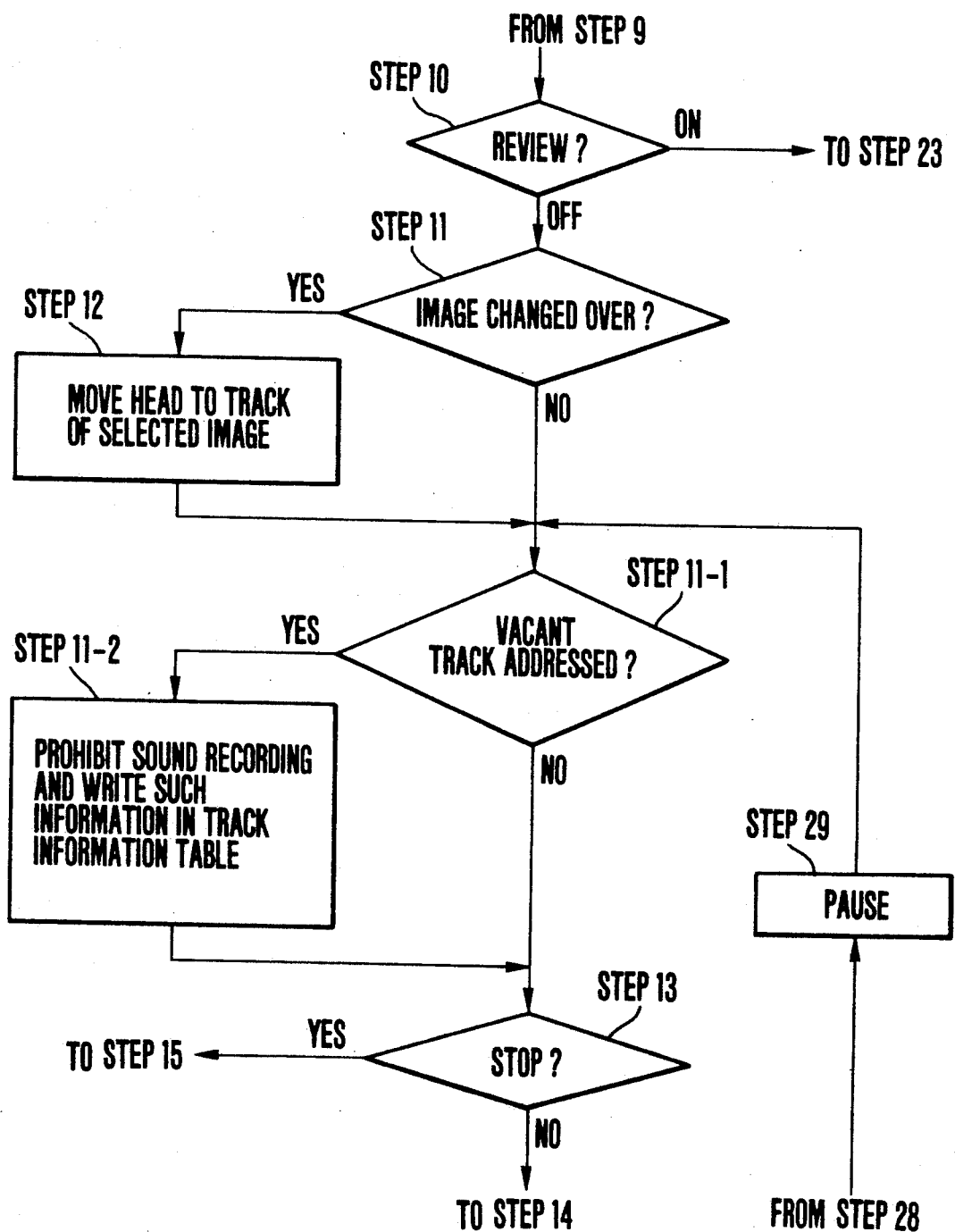
FIG. 4 is a flowchart illustrating an example of modification of the recording sequence.

That is, as shown in FIG. 4, a step 11-1 and a step 11-2 may be added between the step 11 and the step 13. When the fact that the vacant track was addressed in the step 11 is discriminated in the step 11-1, the procedure branches to the step 11-2 where data representing that a still image will subsequently be recorded are written in the corresponding part of the track information table so that a sound is not recorded in the addressed vacant track. By this, it is also made possible to, at first, record the sound and, then, after-record the video signal.

In the step 11, changing over of the still image is carried out, or as it is, the procedure advances to the step 13. In the step 13, a stop request is given out by manipulating the stop switch in the switch group 21, the procedure advances to a step 15. In the step 15, the flag of the recording track in which the sound has so far last been recorded is rewritten to an end flag representing that it does not continue to the other track. After having written that, a series of sound record information is complete at that track, the procedure returns to the step 2, becoming the initial, standby state of the various kinds of operations.

Also, without giving the stop request in the step 13, if, in a step 14, the recording start switch is manipulated, the procedure returns to the step 5, so that recording can be carried out in continuity to the data recorded until now. Also, if, in the step 14, the recording start switch is not manipulated, the procedure returns to the step 10 to wait for the next command in the pause state.

It should be noted that the term "reviewing operation" in the above-described step 10 means an operation of reproducing an audio signal taken in from the pause state of the preceding time to the pause state of the present time and recorded in the recording track on the magnetic disc D, so that the sound recorded by now can immediately be reproduced for checking. And in the case when, in the step 10, there was the command of the reviewing operation, the procedure advances to a step 23 to reproduce the just recorded sound. After the reproduction, the procedure advances to a step 24 so that the operator can select a video signal track which is made to correspond to the next audio signal to be recorded. And when the image has been changed over, the procedure advances to a step 28. After the head has been moved to the selected image track, the apparatus comes again into the pause state in a step 29, and, then, the procedure returns to the step 13. Also, in the case when, without carrying out the changing over in the step 24, the procedure has advanced to the step 25, the reviewing operation can be carried out again. In the case when the reviewing operation was carried out, the procedure returns to the step 23 so that the sound reproduced by now can be once more reproduced. In the case when the command of the reviewing operation was not given, the procedure advances to a step 26 so that it is possible to accept a re-recording operation.

This re-recording operation means an operation in which without moving the magnetic head H from the recording track that was now reproduced, the procedure returns to the step 5 to rewrite the signal of that track. That is, in the case when the reproduced content was improper, by this re-recording operation, after the recording, its content can be immediately reviewed in reproduction and revised to record a proper content. Here, in the case when a request for re-recording is given by the operating switch in the switch group 21, the track information table is altered in a step 27 to change the reproduced track to a vacant track. After that, the procedure advances to the step 5. So the re-cording mode can be operated again. If the re-recording is not carried out, the procedure returns to the step 24 to wait for an action request of image selection.

Figure 5:
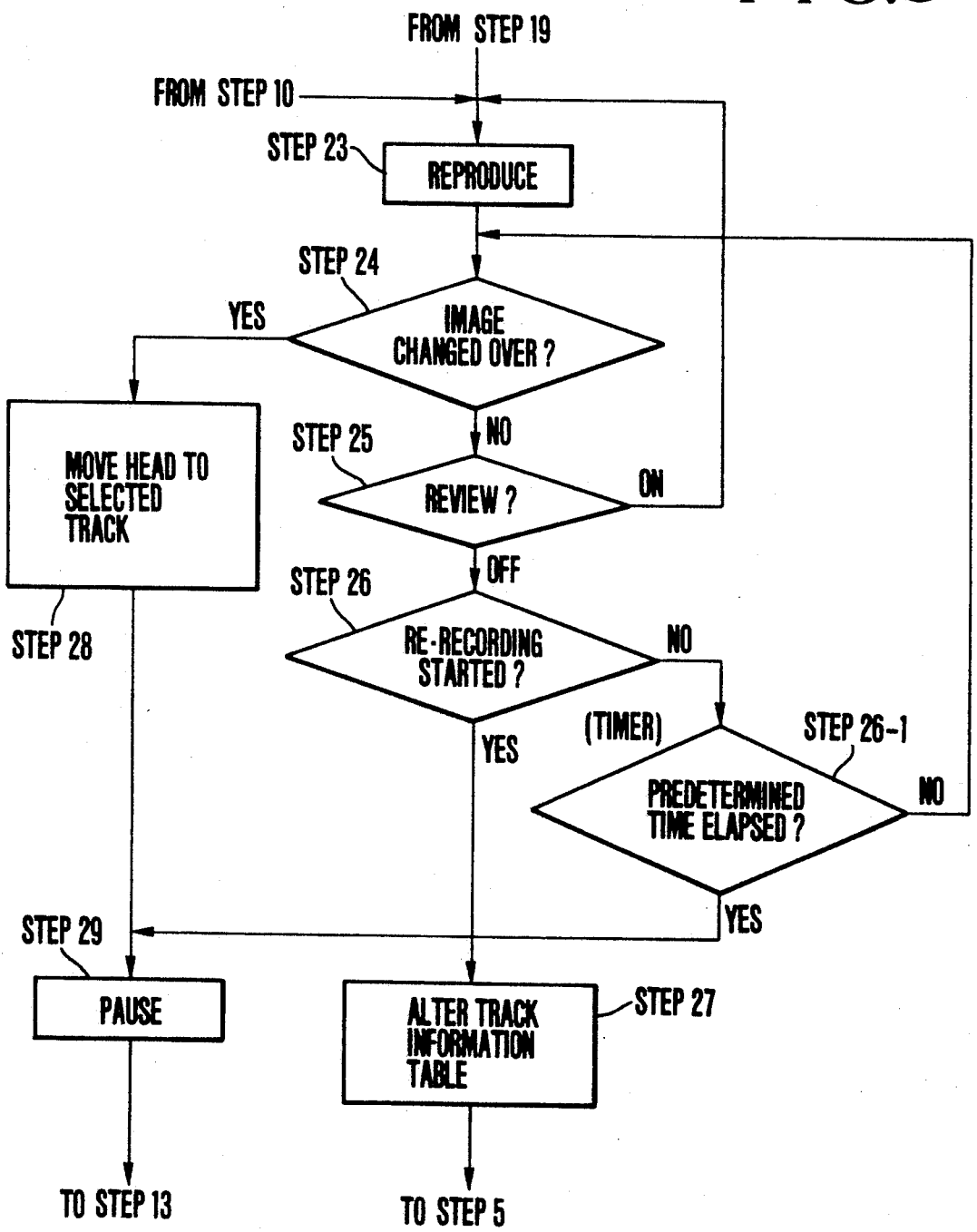
FIG. 5 is a flowchart illustrating another example of modification of the recording sequence.

It should be noted that in the case that for choice of the re-recording operation of the step 26, no manipulation to the re-recording is done, and even in the step 24 the changing over of the image is not carried out, this loop: step 26→step 24→step 25→step 26 is repeated. Therefore, it can also be made possible that, as shown in FIG. 5, a timer is added as a step 26-1 so that when any manipulation is done for more than a predetermined time, the procedure goes out from the above-described loop to the step 29, becoming the pause state.

In the above, the recording of sound, reproduction and changing over of image, and further the pause mode of sound recording, etc., have been described. Yet, in the above-described case that after the recording started in the step 4, the stop request was given in the step 5, and the continuity of the recording has been cut off in the step 16, the procedure advances to a step 17 where a timer (not shown) incorporated in the system controller 18 starts. And the procedure advances to a step 18. In the case when the elapse of a predetermined time has been detected in the step 18, the next operation is judged not to be carried out in sequence, and the operation mode selection standby state of the step 2 results. Also, in the case when the reviewing operation was carried out in the step 19 before the elapse of the predetermined time, the procedure branches to a step 23, becoming the reproduction mode. As has been described above, the sound recorded by now can be reproduced. It should be noted that in the case of not carrying out the reviewing operation, the procedure passes through a step of changing over the image in a step 20 and advances to a step 22. If the recording start request is given, after having moved the head H to another vacant track, the procedure returns to the step 5 so that it is able to record another audio signal. It should be noted that in the case when the changing over of the image has been carried out in the step 20, the procedure advances to the step 21 to move the head H to the selected image track, similarly as described above.

In such a manner, while carrying out the sound recording operation, the pause state is made to occur in each period in which one track of the magnetic disc D can be recorded; in the pause state, whether or not to continue the recording of sound; if to continue, whether or not to record the next audio signal as the data capable of being reproduced in continuity; whether or not to change over the image to be brought into correspondence with the next audio signal to be recorded; whether or not to review the sound recorded just before; and further how to operate the mode after the review, can be chosen.

The above-described sound recording sequence has been described on the case of becoming the pause state each time the period of recording one track of the magnetic disc D has passed. Yet, another recording sequence of the invention is described below.

The other recording mode of the invention is that the audio signal is made recordable without breaks continuously on the magnetic disc. In the following, the case of having this mode provided is explained by using the flowchart shown in FIG. 3.

Figure 3:
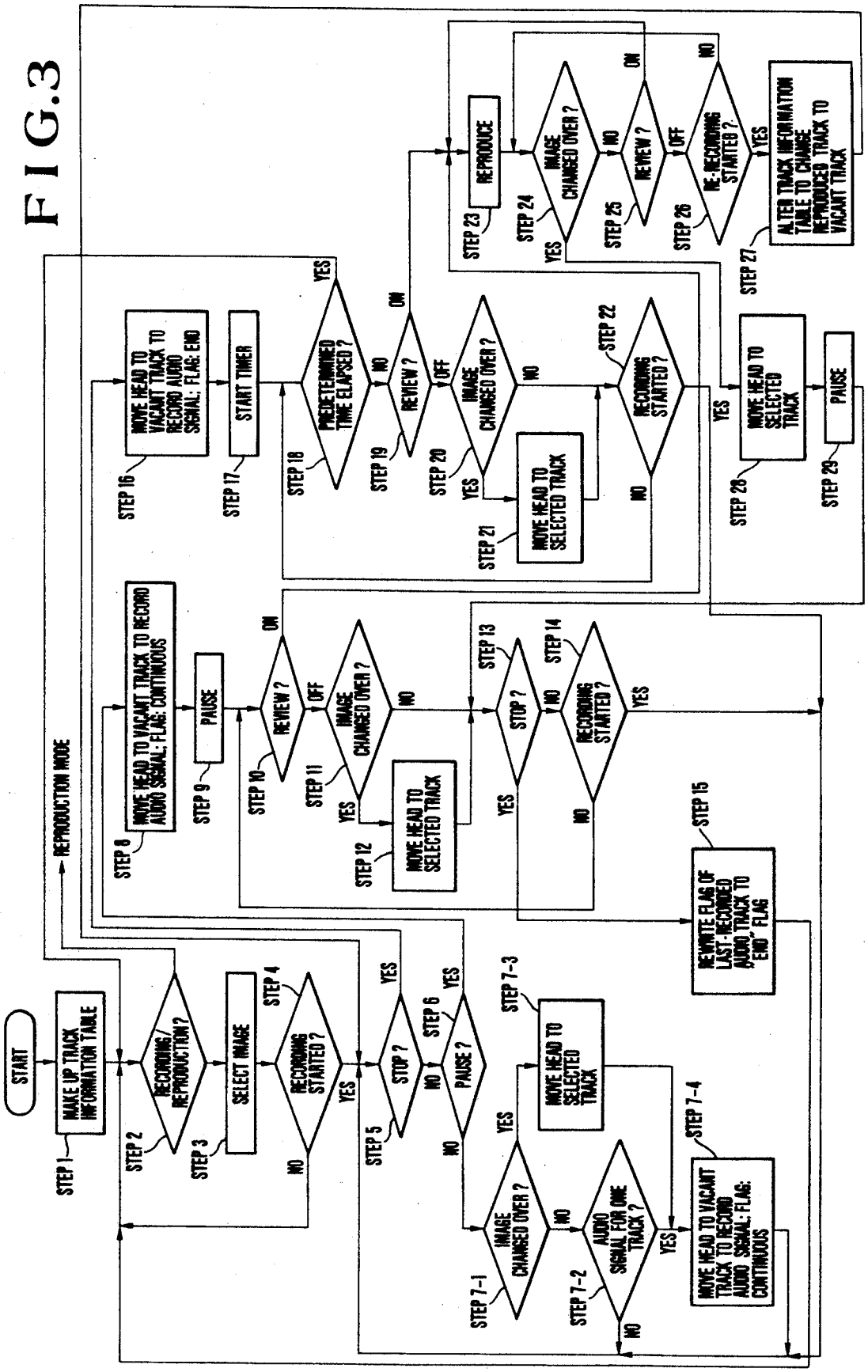
FIG. 3 is a flowchart to explain the continuous recording mode.

In the flowchart of FIG. 3, similarly to the above, the magnetic disc D is loaded and a track information table is made up (step 1). Then, by the switch for setting the recording mode in the switch group 21, each recording mode, reproduction mode, etc., is selected (step 2). According to this embodiment, however, besides the mode which automatically becomes pause after sound recording has been carried out for a predetermined time, a mode is prepared which, after the elapse of the predetermined time, does not become the pause state, but subsequently performs the next recording. In a step 3, an image signal to be recorded at first is selected; after a sound recording has started in a step 4, an operation of taking the inputted audio signal into the sound memory 5 is started. And the presence or absence of the stop and a pause request is examined in a step 5, step 6, respectively. In the case that there was the stop request, the flag and control code for termination at that track are added when the audio signal in the sound memory 5 is recorded on the magnetic disc D. Thus, the pause state occurs. Also, in the case that there was the pause request, the flag and control code for continuity to the next track are added and recorded onto the magnetic disc D. Thus, the pause state occurs. These operations and subsequent operation flow are exactly the same as the operations of step 16-step 22, step 8-step 14, in the flowchart of FIG. 2 respectively. Also, as to the reproduction and re-recording routine of the step 23-step 27, the same holds. Hence, the explanation is omitted here.

Now, the portions which are characteristic of this embodiment are as follows: After having entered a recording operation in the step 4, the presence and absence of the stop, pause manipulation are examined in the step 5 and the step 6. In the case that the stop, pause manipulations both were not done, changing over of the image becomes possible in a step 7-1. When a manipulation of changing over the image has been done, the procedure branches to a step 7-3, where the head H is moved to the track of the selected image to change over the reproduced image, and advances to a step 7-4 where the recording is carried out. In the case that changing over of the image is not carried out in the step 7-1, the procedure advances to a step 7-2, and, at a time when the amount of audio signal recordable in one track on the magnetic disc D at the time base compression rate of the audio signal being recorded at present has been stored in the sound memory 5, the procedure advances to a step 7-4 and, without interrupting the input and storage of the audio signal to and in the sound memory 5, an audio signal equivalent to one track on the sound memory 5 with addition of the flag and control code which enable continuity to the next sound track is recorded in a vacant track on the magnetic disc D. After the end of the recording operation of one track, the procedure returns to a step 5. Thus, the operation of bringing in the record audio signal is continued.

That is, the continuous recording operation (step 8) in the embodiment of FIG. 2 and this embodiment is such a recording operation that when in reproduction, the recorded sound becomes possible to reproduce as a series of groups, and, whether or not the sound signal to be reproduced actually is continuous is not a problem. According to the recording operation in the step 7-4 of this embodiment, however, the input of the signal to the sound memory 5 is not interrupted, the audio signal itself recorded continuously in between the tracks also can be made continuous when in reproduction. It should be noted that, in this case, a range to be reproduced in the case of having done the reviewing operation is the sound recorded in the range from where the preceding pause state occurred to the present time point. In the above, to avoid confusion, the recording operation has been described in separation between the case that each time one track is recorded, the pause state results automatically and the case that a continuous sound is recorded over a plurality of tracks. But it goes without saying that any of the recording modes can be selected according to the necessity in the pause state during the recording operation.

It should be noted that according to this embodiment, the arrangement is made so that if the reviewing operation is carried out in the sound recording pause state, after a recorded portion has been reproduced, the apparatus comes into the re-recording mode, and by carrying out the re-recording or by changing over the still image being displayed, the re-recording mode is escaped. But, by providing a new or re-recording mode switch in the switch group 21, when in re-recording, the image to be brought to correspondence with the sound can be exchanged. Other various modifications are possible.

As has been described above, according to the recording apparatus in the present invention, by making the sound recording operation to be automatically the pause state in a predetermined set time, an increase of the efficiency of use of the magnetic disc D can be achieved, and, while considering the next sound to be recorded and the image to be brought into correspondence with it, recording, editing, etc., can be performed. Therefore, it becomes possible to effectively use the limited area on the magnetic disc and prevent misselection of the image to be brought into correspondence with the sound.

Also, the automatic pause of sound recording and the mode of continuous sound recording are made to be interchangeable in the recording pause state. Hence, the flexibility of the recording method can be increased. For example, during recording of continued sound, the image is made to be exchangeable. Therefore, for the continued sound, a plurality of still images can be made to correspond successively. Further the reviewing operation of reproducing the recorded content from the preceding pause state to the present can be carried out in the recording pause state, making it possible to check during recording. Even after the review, re-recording is made possible according to necessity. Therefore, also in the case of revising the sound data recorded up to the present, the labor and time of erasing from the beginning before the re-recording can be saved. In addition to these advantages there are many others.

It should be noted that in the above-described embodiments, explanation has been made taking an example of the still video system using the magnetic disc device as a recording medium, but it is not confined to this since the present invention is applicable even to the apparatus using another recording medium.

What is claimed is:

1. A recording apparatus capable of recording different record informations together on a recording medium, comprising:
    (A) recording means for recording second record information in correspondence to first record information previously recorded on said recording medium;
    (B) pause means for interrupting the recording of said second record information by said recording means;
    (C) confirming means, operably connected to said pause means and responsive to said pause means interrupting the recording of said second record information by said recording means for reproducing said second record information recorded by said recording means; and
    (D) changeable means for changing the first record information which corresponds to said second record information recorded on said recording medium by said recording means, said changeable means changing said first record information during the reproduction of said second record information by said confirming means.

2. An apparatus according to claim 1, wherein said first record information is a video signal.

3. An apparatus according to claim 2, wherein said second record information is an audio signal to be reproduced along with said video signal.

4. An apparatus according to claim 1, wherein said recording medium is a magnetic disc, and wherein said first record information and said second record information are recorded in separation in respective different tracks on said magnetic disc.

5. An apparatus according to claim 3, wherein said second record information is recorded with a time base thereof compressed.

6. An apparatus according to claim 1, wherein said pause,,means includes first pause control mode for automatically interrupting a recording operation of said recording means each time said second record information is recorded on said recording medium by said recording means for a predetermined time.

7. An apparatus according to claim 6, wherein said pause means includes second pause control mode for forcibly interrupting the recording operation of said recording means in preference to said first pause control mode.

8. An apparatus according to claim 1, further comprising means for selecting first record information from said recording medium in correspondence to a next second record information to be recorded in a state that the recording operation of said recording means is interrupted by said pause means.

9. An apparatus according to claim 8, wherein said recording means is selectively controlled in a mode that, after the selection of said first record information, starts to record the second information in correspondence to said first record information, a mode that stops the recording of the second record information, and a mode that holds the interrupted state of the recording operation of said recording means.

10. An apparatus according to claim 1, further comprising means for, after an operation of said confirming means, selecting from said recording medium the first record information to be brought into correspondence with a next second record information to be recorded.

11. An apparatus according to claim 1 or 10, wherein said confirming means reproduces the second record information recorded after the interruption of the recording operation by said pause means and in a time period from the re-start of the recording operation until the recording operation is interrupted again.

12. An apparatus according to claim 11, further comprising control means for operating said recording means to record new second record information either in an area in which the information reproduced by said confirming means has been recorded or in a different area therefrom after an operation of said confirming means.

13. An apparatus according to claim 1, wherein said recording means records, along with said second record information control, an information representing a correspondence relationship between said first record information and said second record information.

14. A recording apparatus for recording a video signal and an audio signal together on a disc-shaped recording medium, comprising:
    (A) selection means for selecting a video signal track recorded on said recording medium;
    (B) recording means for recording the audio signal in a track on said recording medium other than the video signal track selected by said selection means in correspondence with the video signal track;
    (C) pause means for interrupting an operation of said recording means;
    (D) review means operably connected to said pause means and responsive to said pause means interrupting the operation of said recording means, for reproducing the audio signal recorded by said recording means just before the operation of said recording means is interrupted by said pause means; and
    (E) control means operably connected to said review means for enabling operation of said selection means during operation of said review means.

15. An apparatus according to claim 14, wherein said recording means has a memory for storing the audio signal to be recorded, wherein each time the audio signal recordable in one track of said recording medium is stored in said memory, the audio signal stored in the memory is read out from the memory and recorded in a track on said recording medium.

16. An apparatus according to claim 15, wherein said recording means has a mode for effecting a continuous recording by taking another audio signal into said memory while reading out the audio signal stored in said memory and recording the audio signal read out of the memory on said recording medium.

17. An apparatus according to claim 14, wherein said pause means interrupts a recording operation of said recording means each time the audio signal is recorded by said recording means for a predetermined time.

18. An apparatus according to claim 17, wherein said selection means selects a video signal track on said recording medium in correspondence to a next audio signal to be recorded in a state that the recording operation of said recording means is interrupted.

19. An apparatus according to claim 17, wherein said review means is able to operate in a state that a recording operation of said recording means is interrupted by said pause means.

20. An apparatus according to claim 19, wherein said recording means is able to record a new audio signal either in the reproduced audio signal track by said review means, or in a vacant track other than said reproduced track.

21. An apparatus according to claim 14, wherein said recording means records an information representing a correspondence relationship between said video signal and said audio signal on said recording medium along with said audio signal, and said information is representing a track position in which said video signal is reproduced.

22. An apparatus according to claim 21, wherein said audio signal is recorded with a time base of said audio signal compressed on said recording medium.

23. A recording apparatus which is able to record on a recording medium a first signal and second signal having different characteristics from each other on a plurality of tracks in a mixed state, comprising:
  (A) first reproducing means for reproducing the first signal already recorded on the recording medium;
  (B) recording means for recording the second signal in correspondence with the first signal reproduced by said first reproducing means and for recording the first signal;
  (C) first control means for controlling execution and interruption of recording operation of said recording means;
  (D) selecting means operably connected to said first reproducing means and said first control means, said selecting means for operating said first reproducing means and selecting said first signal from said recording medium when the operation of said recording means is interrupted by said first control means;
  (E) second reproducing means operably connected to said first control means for reproducing said second signal recorded by said recording means when the operation of said recording means is interrupted by said first control means; and
  (F) second control means for controlling said recording means so that as the first signal selected by said selecting means is recorded on said recording medium, said first signal corresponds to the second signal reproduced by said second reproducing means.

24. An apparatus according to claim 23, wherein said recording means is able to rerecord the second signal after said second signal has been reproduced by said second reproducing means.

25. An apparatus according to claim 23, wherein said control means is arranged to control said recording means, to enable setting said recording means to a first mode in which the recording is interrupted each time when the recording of said second signal is effected for a predetermined time and to a second mode in which the recording is continued until it receives an outcoming signal indicating interruption of the recording.

26. An apparatus according to claim 23, wherein said first signal is an image signal.

27. An apparatus according to claim 26, wherein said second signal is an audio signal.

28. An apparatus according to claim 27, wherein said recording medium is a magnetic disc-shaped recording medium, and said first and second signals are recorded on concentric circular tracks on said medium.

29. An apparatus according to claim 23 or 28, wherein said first signal and said second signals are recorded at any desired positions on said recording medium and address signals indicating that they belong to a same group are recorded, to enable simultaneous reproduction of these signals.

30. An apparatus according to claim 23, wherein said second signal is recorded on said recording medium in time-base compressed state.

31. An apparatus according to claim 30, wherein said recording means includes a memory for changing the time base of said second signal.

32. A recording and reproducing apparatus which is able to record and reproduce a first signal and a second signal different from each other in a plurality of areas on a recording medium, comprising:
  (A) selecting means for selecting any desired area for recording said first signal on said recording medium;
  (B) recording means for recording said first signal in said selected area and for recording the second signal in an area other than the area selected by said selecting means, in correspondence to said area selected by said selecting means;
  (C) first control means for controlling execution and interruption of recording operation of said recording means;
  (D) second control means operably connect to said selecting means and said first control means, said second control means controlling said selecting means, when the operation of said recording means is interrupted by said first control means, to change the area for recording said first signal;
  (E) reproducing means operably connected to said first control means for reproducing said second signal recorded on said recording medium when the operation of said recording means is interrupted by said first control means; and
  (F) means for controlling said recording means so that as the first signal selected by said selecting means is recorded on said recording medium, said first signal corresponds to the second signal reproduced by said second reproducing means.

* * * * *

UNITED STATES PATENT AND TRADEMARK OFFICE
CERTIFICATE OF CORRECTION

PATENT NO. : 5,164,841

DATED : November 17, 1992

INVENTOR(S) : Hirokazu Takahashi

It is certified that error appears in the above-identified patent and that said Letters Patent is hereby corrected as shown below:

Title Page:
Abstract, line 5.   Change "are" to -- is --
Col. 1, line 29.    Change "in which" to -- of --
Col. 1, line 58.    Change "These" to -- This --
Col. 1, line 62.    After "making" insert -- a --
Col. 1, line 62.    Delete "the"
Col. 2, line 31.    Change "when" to -- manageability --
Col. 2, line 35.    Delete "the manageability therefor"
Col. 4, line 43.    Change "have" to -- has --
Col. 9, line 25.    Change "on" to -- in --
Col. 9, line 25.    Change "on" to -- in --
Col. 9, line 48     Change "Stop and" to --stop,--.
Col. 9, line 49.    Delete "a"
Col. 9, line 49.    After "step 5," insert -- and a --
Col. 9, line 60.    After "Fig. 2" insert -- , --
Col. 9, line 66.    Change "manipulation" to -- manipulations --

UNITED STATES PATENT AND TRADEMARK OFFICE
CERTIFICATE OF CORRECTION

PATENT NO. : 5,164,841
DATED : November 17, 1992
INVENTOR(S) : Hirokazu Takahashi It is certified that error appears in the above-indentified patent and that said Letters Patent is hereby corrected as shown below:

Column 11, line 62, Delete " " " .

Signed and Sealed this

First Day of February, 1994

Attest:

BRUCE LEHMAN

*Attesting Officer*      Commissioner of Patents and Trademarks